United States Patent

[11] 3,584,471

| [72] | Inventor | Harold R. Powell |
| | | King of Prussia, Pa. |
| [21] | Appl. No. | 850,589 |
| [22] | Filed | Aug. 15, 1969 |
| [45] | Patented | June 15, 1971 |
| [73] | Assignee | Pennwalt Corporation |
| | | Philadelphia, Pa. |

[54] CONTINUOUS FREEZING APPARATUS INCLUDING COOLING PLATEN
10 Claims, 6 Drawing Figs.

[52] U.S. Cl..................................................... 62/380,
 62/435, 165/120
[51] Int. Cl...................................................... F25d 25/04
[50] Field of Search........................................... 62/380,
 430, 435, 345; 34/124; 100/93 P; 165/107, 120

[56] References Cited
UNITED STATES PATENTS

| 2,437,492 | 3/1948 | Allen | 165/86 |
| 2,855,093 | 10/1958 | Ek | 198/193 |
| 3,280,590 | 10/1966 | Larsson | 62/345 |
| 3,387,464 | 6/1968 | Martin | 165/120 |
| 3,491,543 | 1/1970 | Field | 62/345 |

*Primary Examiner*—Meyer Perlin
*Assistant Examiner*—Ronald C. Capossela
*Attorneys*—Carl A. Hechmer, Jr. and Stanley Bilker

ABSTRACT: Continuous freezing apparatus in which a heat transfer cooling platen is supported under an endless freezing belt. A primary brine of low viscosity is pumped in a closed loop through the platen, and a secondary brine is circulated through the platen in heat exchange disposition with the primary brine circuit. After it has been cooled by the primary brine, the secondary brine is percolated through the platen into sealing contact with the belt and returned for recirculation in an open loop.

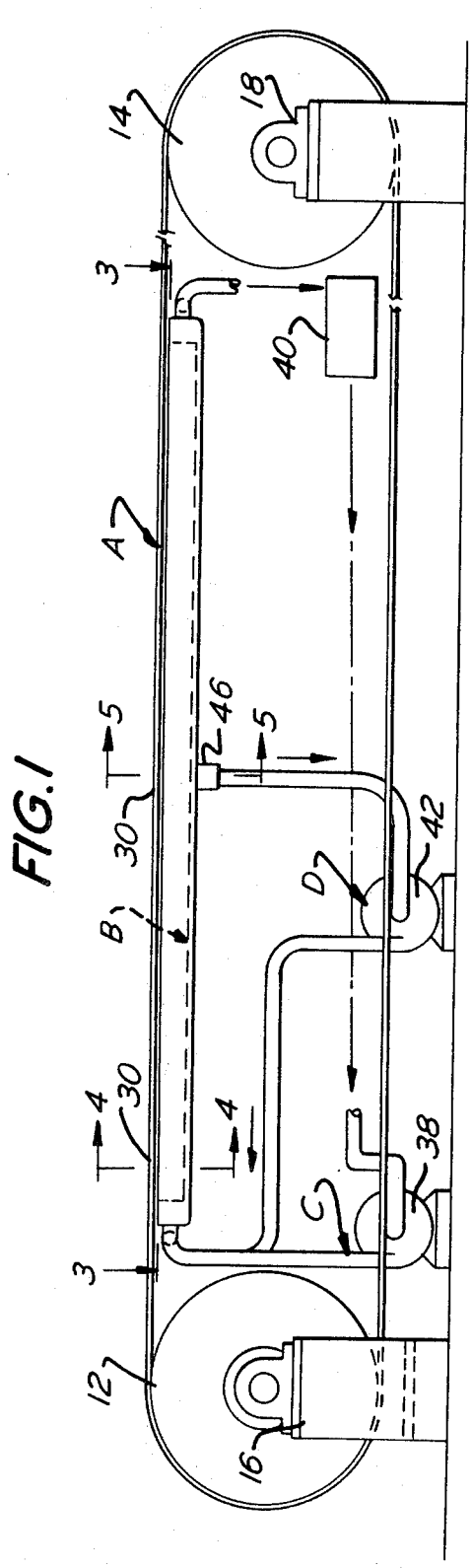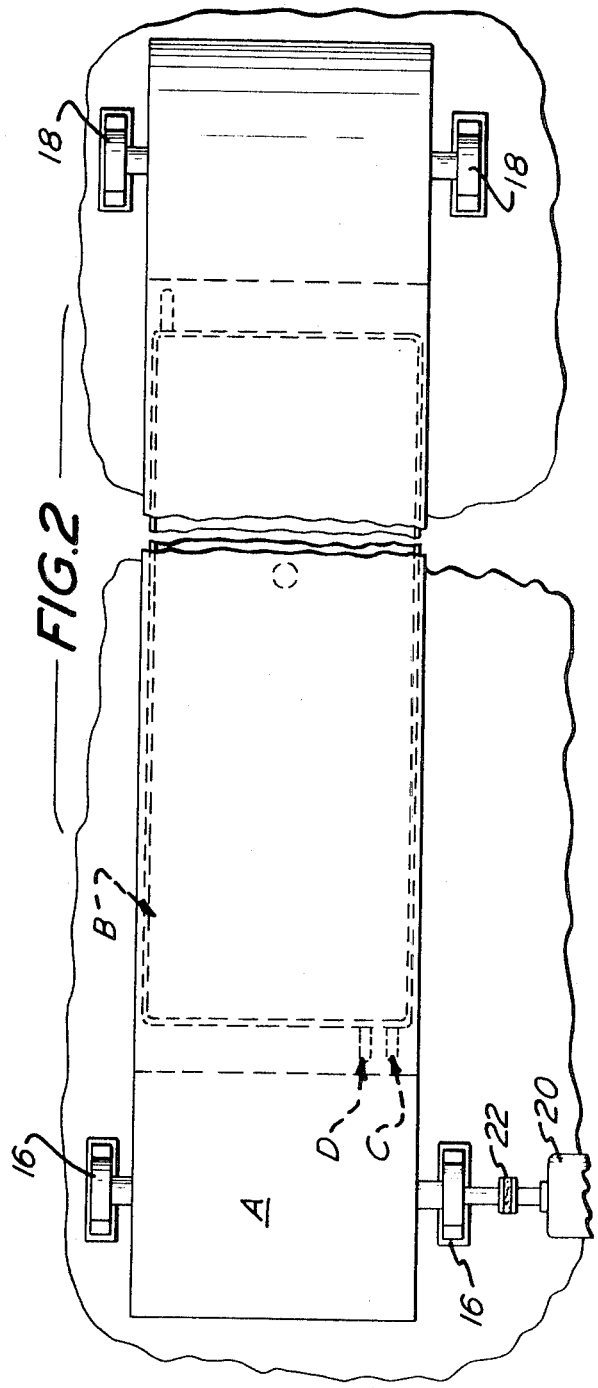

PATENTED JUN 15 1971 3,584,471

INVENTOR
HAROLD R. POWELL
BY
*Stanley Bilker*
ATTORNEY

CONTINUOUS FREEZING APPARATUS INCLUDING COOLING PLATEN

The invention relates to continuous freezing apparatus and more particularly relates to a freezing belt or conveyor on which a product in a liquid state applied at one end is transformed into a frozen state during motion of the belt to the other end. The present invention is generally pertinent to freezing belt systems shown in U.S. Pat. No. 2,437,492 and No. 2,855,093.

In the typical cooling systems for belt freezing, a brine, such as ethylene glycol, was circulated through a refrigerative heat exchanger and then pumped into a trough or vessel in which the cooled brine was maintained at a generally constant level. The freezing belt was then passed through the brine with just the lower surface of the belt immersed. The belt, usually metallic and having dimensions perhaps 100 feet long and 4 feet wide became chilled and correspondingly chilled the product applied upon its upper surface. Since the brine in the open trough was exposed to atmosphere, it necessarily required that such brine have low volatility characteristics. However, because low volatility goes hand in hand with high viscosity properties in organic liquid coolants, relatively large pumps of considerable horse power were necessitated to provide adequate flow rate and cooling.

It is therefore an object of this invention to provide a circulatory cooling system for a freezing belt in which minimal size pumps and heat exchangers are required.

Another object of this invention is to provide a freezing belt refrigeration system in which the primary circulatory brines employed are of low viscosity and high volatility.

Still another object of this invention is to provide a freezing belt refrigeration system which requires a minimal amount of high viscosity secondary brine for maintaining a liquid seal for the freezing belt.

Yet still another object of this invention is to provide a freezing belt refrigeration system which utilizes two separate and distinct circulatory systems—one a closed loop for the primary or principal cooling brine in which a low viscosity fluid is used, and the other an open channel for the secondary brine in which a high viscosity liquid is used as a heat transfer medium and liquid seal for the belt.

A further object of the invention is to provide a freezing belt heat transfer system in which a small amount of high viscosity brine is used as a liquid seal for the belt thereby minimizing the size requirements for the pumps, for the heat exchangers and for the floor space.

Yet still a further object of this invention is to provide a highly efficient heat transfer system for a continuous belt freezer.

Other objects of this invention are to provide an improved device of the character described which is easily and economically produced, sturdy in construction, and highly efficient and effective in operation.

With the above and related objects in view, this invention consists of the details of construction and combination of parts as will be more fully understood from the following detailed description when read in conjunction with the accompanying drawings in which:

FIG. 1 is a side elevational view of a freezing conveyor embodying this invention;

FIG. 2 is a top plan view thereof;

Figure 3:
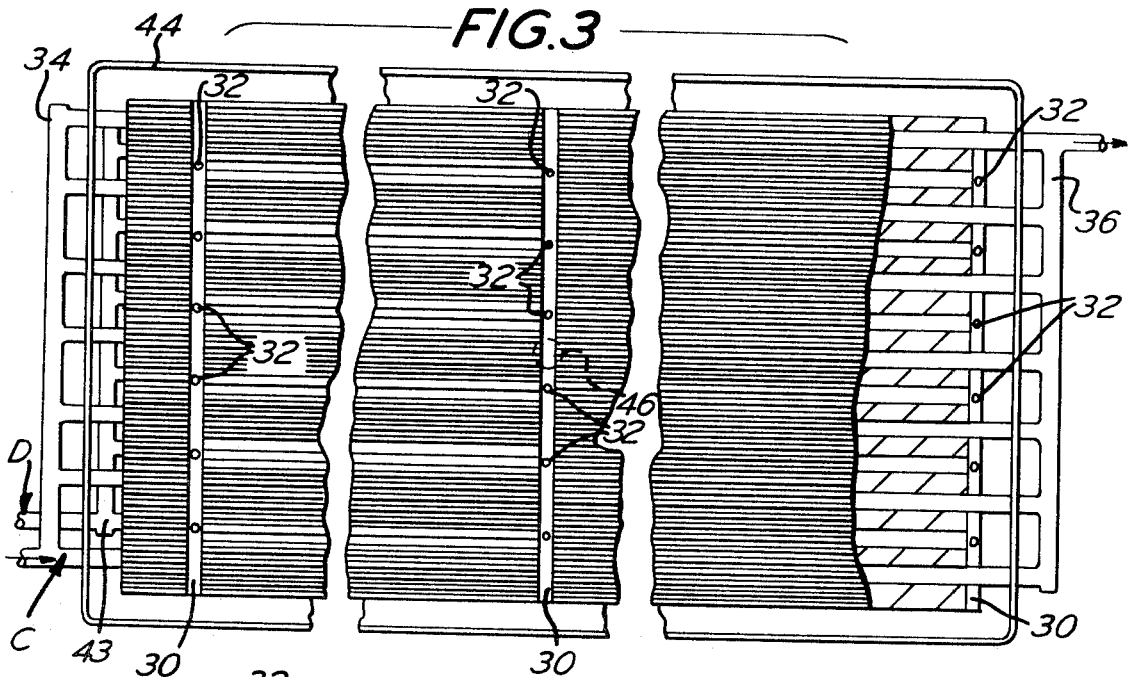
FIG. 3 is a sectional view taken along lines 3-3 of FIG. 1.
Figure 4:
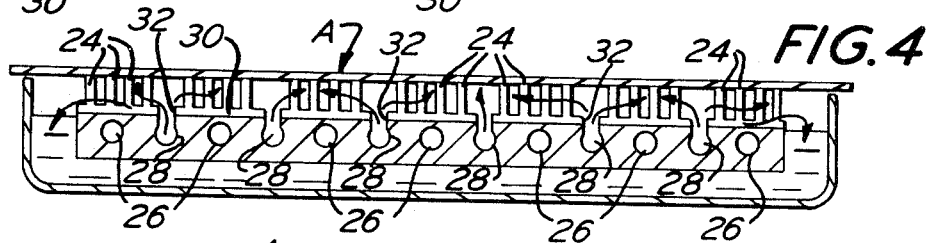
FIG. 4 is a sectional view taken along lines 4-4 of FIG. 1.
Figure 5:
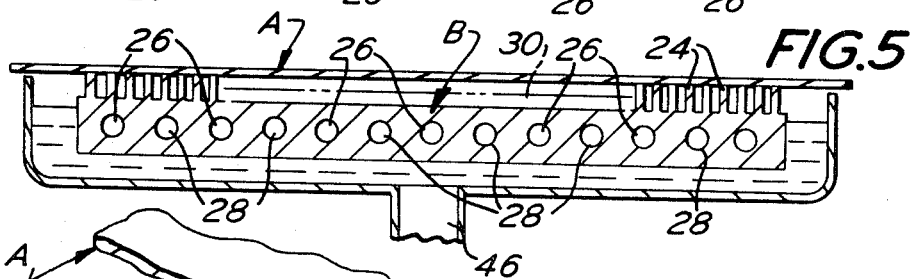
FIG. 5 is a sectional view taken along lines 5-5 of FIG. 1.
Figure 6:
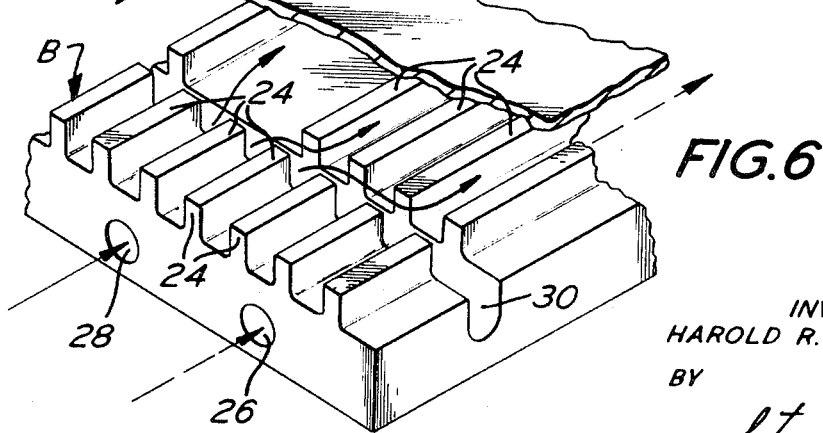
FIG. 6 is a fragmentary perspective view of the cooling platen embodied in this invention.

Referring now in greater detail to the drawings in which similar reference characters refer to similar parts, there is shown a continuous freezing system comprising an endless belt or carrier, generally designated as A, and a cooling platen B supported under the upper level of the belt A immediately below the undersurface thereof. A principal brine circuit C is channeled through the platen B in a closed loop, and a secondary brine circuit D in heat transfer disposition with the principal brine circuit and bubbles out of the platen B into sealing contact with the undersurface of the belt.

The belt A may be of plastic or metal, although preferably the latter for thermal conductivity, and should be sufficiently long to permit the liquid substance applied at one end to be completely frozen when reaching the head end (the right-hand side as shown in FIGS. 1 and 2). A typical belt is 50 to 120 feet long and perhaps 3 to 5 feet wide and is composed of a plurality of welded stainless steel sections which act as the freezing surface. A tail roller 12 and head roller 14 support and hold the belt in endless configuration. The rollers 12 and 14 are suitably journaled in lateral pillow blocks 16 and 18. Tail roller 12 is driven by an adjustable speed motor-reducer unit 20 through coupling 22.

The cooling platen B comprises a plurality of longitudinally coupled sections—10 to 20 individual platen units—arranged in series immediately below the upper belt level. A plurality of laterally spaced ridges 24 upwardly extend from the cooling platens in a single plane and define a medial support for the belt A. Each of the platen units is approximately 6 feet long and is individually controlled for temperature. A plurality of laterally spaced bores 26 extend longitudinally through each of the platens B, and alternately arranged with the bores 26 are a plurality of conduits 28. Transverse slots 30 are cut at predetermined intervals through the ridges 24 and the surface of the platens. Apertures 32 are drilled through the slots 30 into communication with each of the conduits 28 but not the bores 26.

The primary brine enters each of the platen units B by way of an inlet manifold 34 and then passes longitudinally from left to right through the bores 26. Outlet manifold 36 completes the circuit for the primary brine back to a pump 38 and heat exchanger or refrigeration unit 40. Thus, the primary brine flows in a completely closed loop without being exposed to the atmosphere.

The secondary brine circuit D includes a pump 42 which directs the high viscosity secondary brine through manifold line 43 and thence into the conduits 28 in parallel heat exchange disposition with the primary bring flowing in the bores 26. Portions of the secondary brine successively percolate through the apertures 32 in respective slots 30. The secondary brine thus flows up under the belt A through the channels between the ridges 24 and then overflows into a trough 44. The side and end walls of the trough 44 are below the level of the belt and preferably just below the level of the ridges 24. Where individual temperature control is desired, one trough 44 is supported below a corresponding platen unit B. The secondary brine returns by gravity through a drain 46 and pipe 48 back to pump 42 of recirculation. Thus, the secondary brine circuit D is seen to be an open loop. It is also to be indicated that the primary brine circuit may be arranged in parallel countercurrent flow with the secondary circuit.

Since the principal brine circuit C is a closed loop, any heat transfer brine may be employed without regard to volatility or toxicity. Hence the primary brine may be trichlorethylene, or even a direct expanding refrigerant such as the commonly used fluorinated hydrocarbons, refrigerant 12 for example. Because the primary brine is of low viscosity, relatively small size pumping equipment and refrigeration equipment is required. By placing the cooling platen B or platen units directly under the belt A, only a small amount of high viscosity secondary brine, ethylene glycol for example, is needed to form a liquid seal between the belt A and the heat transfer cooling platen B. Therefore, smaller external pumps 42 are required to pump the high viscosity secondary brine and smaller pumps 38 and heat exchangers 40 are needed to cool the primary brine.

What I claim is:

1. Continuous freezing apparatus comprising an endless conveyor belt moving in a predetermined direction, a cooling platen juxtaposed with the undersurface of said belt and including a plurality of bores and a plurality of conduits, means to circulate a primary brine through the bores of said platen in a closed loop, means to pump a secondary brine through the conduits of said platen in heat exchange disposition with said primary brine, including means to percolate said secondary brine from said conduits into contact with the undersurface of said belt, and means to return said secondary brine to said means to pump.

2. The apparatus of claim 1 wherein said cooling platen includes a plurality of ridges upstanding therefrom.

3. The apparatus of claim 2 wherein the secondary brine forms a liquid seal between said belt and said platen.

4. The apparatus of claim 3 wherein said means to percolate comprise a plurality of longitudinally spaced apertures in communication with said conduits.

5. The apparatus of claim 4 wherein said means to percolate includes slot means communicating with said conduits and directing the secondary brine within channels between said ridges.

6. The apparatus of claim 5 wherein said primary brine and said secondary brine passes through their respective bores and conduits in the same direction.

7. The apparatus of claim 6 wherein said slot means is oriented transverse to said conduits and in communication therewith.

8. The apparatus of claim 7 wherein a trough is supported under said platen and catches the overflow of said secondary brine.

9. The apparatus of claim 8 wherein said primary brine is a low viscosity refrigerant.

10. The apparatus of claim 9 wherein said primary brine is a direct expanding refrigerant.